Figure 1:
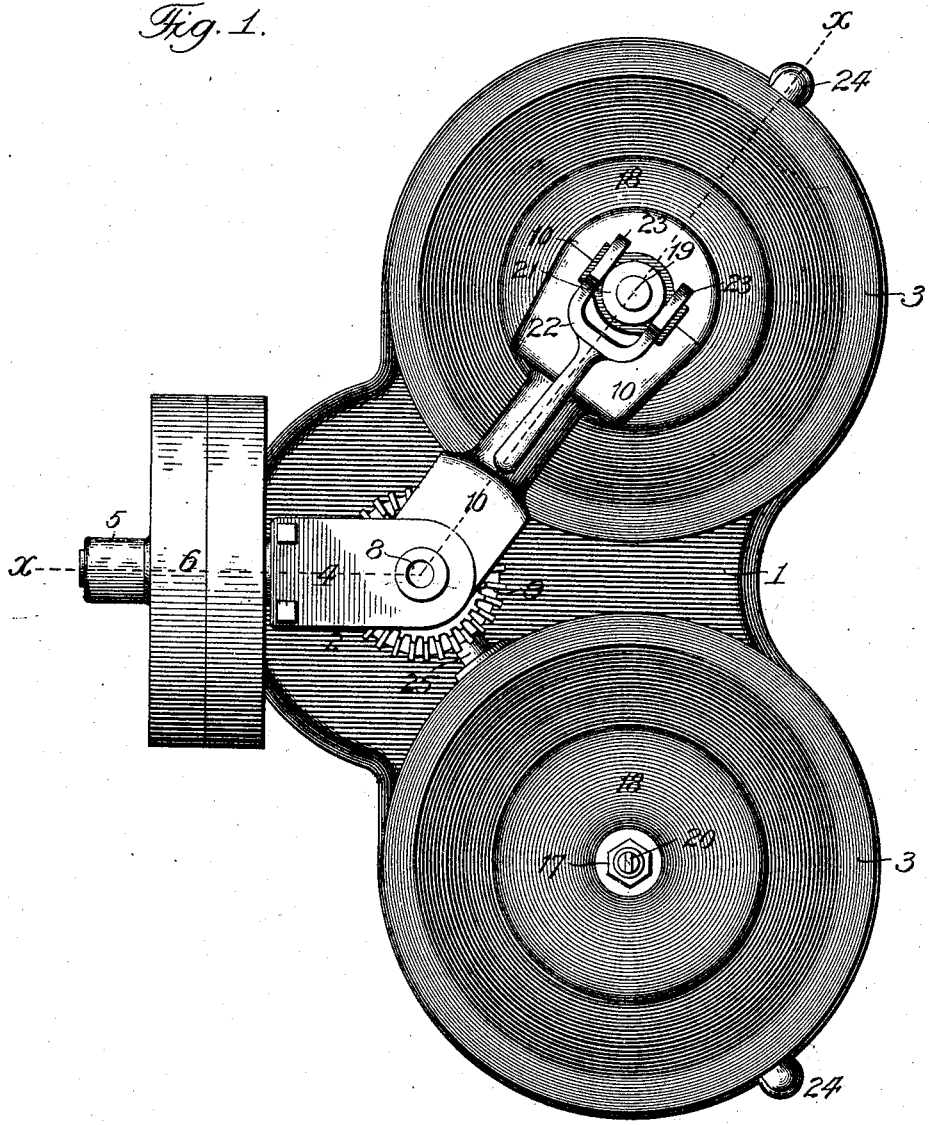

No. 800,274. PATENTED SEPT. 26, 1905.
G. F. DICKSON.
ICE CREAM FREEZER.
APPLICATION FILED DEC. 23, 1904.
2 SHEETS—SHEET 2.
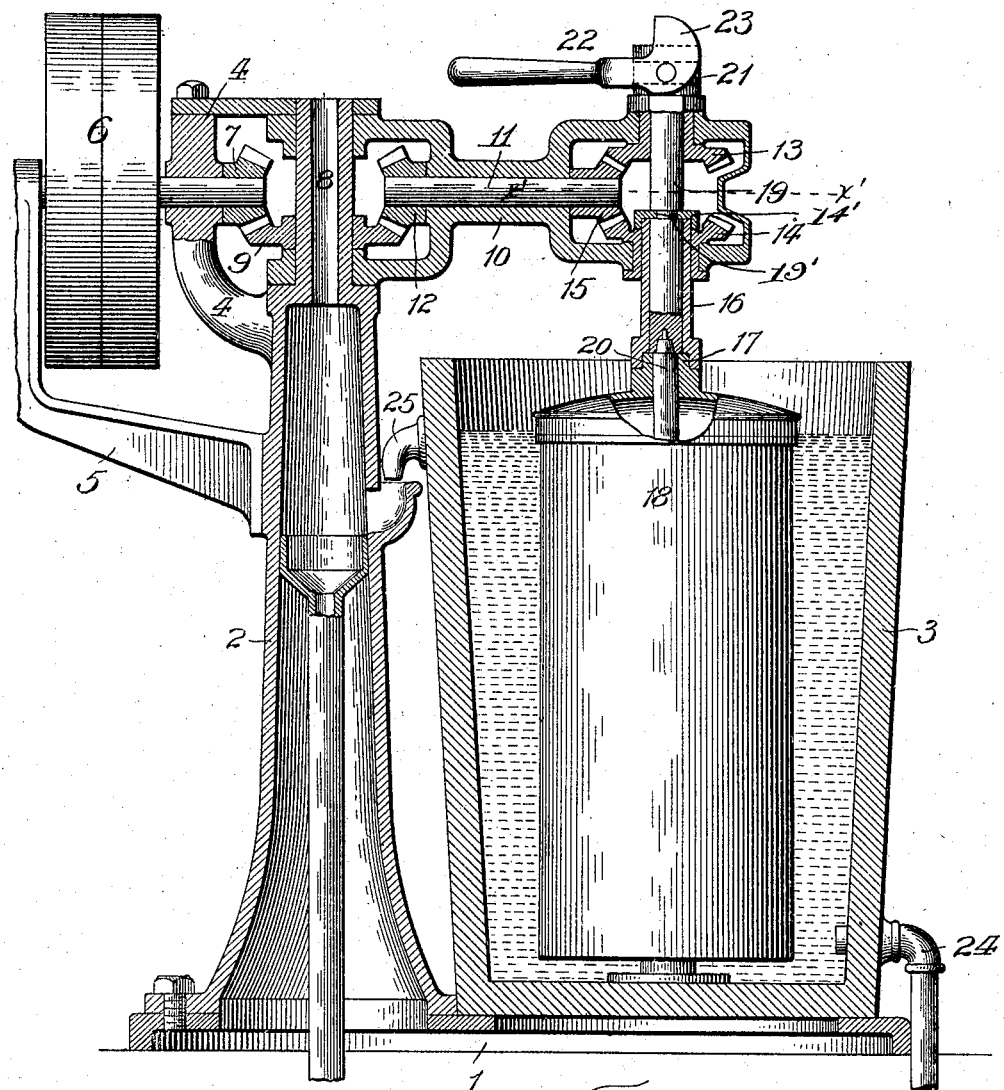
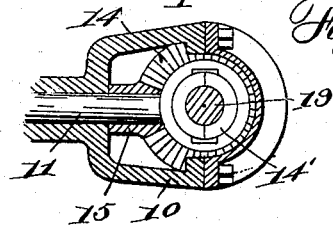
Attest:
John Enders,
M. H. Holmes.
Inventor:
George F. Dickson,
by Robert Burns
Attorney.

UNITED STATES PATENT OFFICE.

GEORGE F. DICKSON, OF CHICAGO, ILLINOIS, ASSIGNOR TO CONFECTIONERS AND BAKERS SUPPLY CO., A CORPORATION OF ILLINOIS.

ICE-CREAM FREEZER.

No. 800,274.          Specification of Letters Patent.          Patented Sept. 26, 1905.

Application filed December 23, 1904. Serial No. 238,065.

*To all whom it may concern:*

Be it known that I, GEORGE F. DICKSON, a citizen of the United States of America, and a resident of Chicago, in the county of Cook and State of Illinois, have invented certain new and useful Improvements in Ice-Cream Freezers, of which the following is a specification.

This invention relates to that class of ice-cream freezers in which the freezer-can and its dasher have a vertical arrangement and receive rotation in opposite directions; and the present improvement has for its object to provide a simple and efficient structural arrangement and combination of parts whereby the removal and replacement of the freezing-can and contents can be accomplished in a rapid and convenient manner in the operation of replacing a can of cream already frozen with a can of cream prepared for the freezing operation, all as will hereinafter more fully appear.

In the accompanying drawings, Figure 1 is a plan view of the present invention in its preferred form, in which a pair of stationary freezing-cans and their accessories are adapted for alternate operation by a single driving mechanism. Fig. 2 is a vertical sectional elevation of the apparatus on the irregular line $xx$, Fig. 1. Fig. 3 is a detail horizontal section on the line $x'x'$, Fig. 2.

Similar numerals of reference indicate like parts in all the views.

Referring to the drawings, 1 is the bed or base of the machine, carrying the post or standard 2, by which the operating mechanism is carried, and it is preferable to make such base of a size adapting it to support a pair of stationary freezing-tubs 3, as illustrated in Fig. 1, in order that the freezing operation may be conducted in a substantially continuous manner by an alternate use of the tubs 3, in that while the freezing operation is taking place in one tub the other tub can be prepared for a succeeding freezing operation, as usual in some forms of ice-cream freezers now on the market.

4 is an upwardly-extending inner arm at the upper end of the aforesaid machine post or standard, and 5 is an upwardly-extending outer arm secured to said standard and adapted, in conjunction with said inner arm, to afford bearings for the horizontal carrying-shaft of the driving-pulleys 6 and the vertical bevel-gear 7 of the driving mechanism of the machine.

8 is a fixed vertical shaft carried by the standard 2 and affording a bearing for a horizontal bevel-gear 9, which meshes with and is driven by the vertical bevel-gear 7 aforesaid. Such shaft also affords a pivotal attachment for the horizontally-swinging frame, hereinafter described.

10 is the horizontally-swinging frame, above referred to, having at its inner or rear end lower and upper fork members providing a fork by which pivotal attachment is had with the vertical shaft 8 aforesaid and provided at its forward or outer end with lower and upper fork members providing a fork or hollow housing for portions of the operating mechanism of the freezer-can and dasher hereinafter described in detail.

11 is a horizontal shaft journaled in the swinging frame 10 and carrying at its rear end a vertical bevel-gear 12, which meshes with and is driven by the aforesaid horizontal bevel-gear 9, and the arrangement is such that a horizontal swinging movement of the frame can be made without disturbing the driving engagement between the train of bevel-gears 7, 9, and 12, above described.

13 and 14 are upper and lower bevel-gears meshing with and driven by a vertical bevel-gear 15 on the forward end of the horizontal shaft 11 and adapted to rotate in opposite directions.

16 is a vertically-arranged and slidable tubular shaft splined to the lower bevel-gear 14, so as to be capable of an independent vertical movement with relation to such gear while still retaining rotative connection therewith. The lower end of said shaft is formed with an enlarged cavity having at its lower end a non-circular portion adapted for operative engagement with a similarly-formed boss 17 on the upper head or cover of the freezing-can 18 of the apparatus.

19 is a vertically-slidable shaft splined to the upper bevel-gear 13, so as to be capable of an independent vertical movement with relation to such gear while retaining rotative connection therewith. The lower portion of such shaft has axial arrangement in the bore of the aforesaid tubular shaft 16 and at its lower end is formed with a non-circular cavity adapted for operative engagement with a correspondingly-formed extension on the upper end of the shaft 20 of the dasher or beater arranged within the freezing-can 18 aforesaid.

21 is a collar connected to the upper end of the vertical shaft 19 and in a manner which permits of a free rotation of such shaft in said collar.

22 is a lifting member pivotally attached to the collar 21 and comprising an operating-handle and a cam-shaped body portion 23, having bearing abutment upon the top surface of the swinging frame 10 adjacent to the vertical shaft 19, as illustrated in Fig. 2.

With the described arrangement of parts and with the lifting member in the position shown in Fig. 2 the vertical shafts 19 and 16 are in their lower position and in operative engagement with the dasher and freezing-can, respectively. By giving a half-turn to said lifting member by means of its operating-handle the cam-shaped body portion 23 moves upon the surface of the swinging frame 10 to impart an upward movement to the collar 21 and through said collar lift the shafts 19 and 16 into their upper portions free from engagement with the dasher and freezing-can, so that the same may be removed and replaced in the continued practical use of the apparatus. The feature of vertical disengagement of the aforesaid driving-shafts from the freezing-can and dasher is quite common to freezers now on the market. Such feature, however, constitutes in the present improvement an important adjunct to the main feature thereof and in which the overhanging portion of the driving mechanism and the carrying-frame thereof are arranged to swing in a horizontal plane to one side or the other of the apparatus, so that a free vertical path is left for the removal and replacement of the freezing can or cans 18 in a ready and convenient manner and without in any manner disturbing the stationary arrangement of the freezing tub or tubs.

The collar 14' is of the ordinary halved nature, secured together in any usual manner, and is an old and well-known provision in the present class of freezers. Such collar connects the central shaft 19 to the annular shaft 16 in a manner to permit independent rotation of said shafts while preventing independent longitudinal travel of one with relation to the other. An annular groove 19' is formed in the shaft 19, which receives the two parts of the collar 14', these parts being firmly secured to the tubular shaft 16.

The present improvement is of material value in that type of ice-cream freezers in which a cooled brine is used as the freezing medium, in that the brine inlet and outlet pipes or passages can have a fixed relation to the freezing tub or tubs and without the requirement of turning or detachable connections usually required where the tubs are made movable on the supporting-base. In the construction shown in the drawings, 24 is the brine-inlet pipe, and 25 the brine-outlet pipe, from each freezing-tub aforesaid.

While the present invention is specially applicable to an apparatus having a pair of freezing-tubs, as heretofore described, its scope is not limited to such application, but may be used in a construction having a single freezing-tub, where circumstances may indicate such change.

Having thus fully described my said invention, what I claim as new, and desire to secure by Letters Patent, is—

1. An ice-cream freezer comprising a standard, a vertical shaft and a horizontal driving-shaft supported upon the standard, a swinging frame having a rear fork whereby the swinging frame is hinged to the vertical shaft and lower and upper fork members providing a forward fork adapted to project over one of a plurality of freezing-tubs, a horizontal inner bevel-gear, loosely mounted upon the vertical shaft, within the rear fork, a vertical bevel-gear fixed to the inner end of the driving-shaft and meshing with the horizontal bevel-gear, a horizontal driven shaft mounted in the swinging frame, a vertical bevel-gear fixed to the inner end of the horizontal driven shaft within the rear fork, and meshed by the horizontal inner bevel-gear, a vertical outer bevel-gear fixed to the outer end of the horizontal driven shaft, within the forward fork, a vertically-slidable inner shaft extending across the forward fork, a vertically-slidable tubular outer shaft surrounding the vertical slidable inner shaft in the lower outer fork member and connected with the vertically-slidable inner shaft so as to move therewith, a lower bevel-gear through which the vertically-slidable tubular outer shaft is adapted to slide, and fixed to the latter so as to turn therewith within the lower outer fork member and meshed by the vertical outer bevel-gear, an upper bevel-gear, through which the vertically-slidable inner shaft extends, fixed to the latter, so as to turn therewith, within the upper outer fork member, means for detachably connecting the vertically-slidable inner shaft and the vertically-slidable tubular outer shaft to the dasher-shaft and can respectively, and means for raising and lowering the vertically-slidable inner shaft with the vertically-slidable tubular outer shaft for disconnecting the vertically-slidable inner shaft and the vertically-slidable tubular outer shaft from the dasher-shaft and can respectively.

2. An ice-cream freezer comprising a standard supporting a vertical shaft and upwardly-extending inner and outer arms, a horizontal driving-shaft mounted in the arms, a swinging frame formed with lower and upper inner fork members, providing a rear fork whereby the swinging frame is hinged to the vertical shaft, and with lower and upper outer fork members, providing a forward fork adapted to project over one of a plurality of freezing-tubs, a horizontal inner bevel-gear, loosely mounted upon the vertical shaft, within the rear fork, a vertical bevel-gear fixed to the inner end of the driving-shaft and meshing with the horizontal bevel-gear, a horizontal driven shaft mounted in the swinging frame, a vertical bevel-gear fixed to the inner end of the driven shaft within the rear fork and meshed by the horizontal inner bevel-gear, a vertical outer bevel-gear fixed to the outer end of the horizontal driven shaft within the forward fork, a vertically-slidable inner shaft extending across the forward fork, a vertically-slidable tubular outer shaft surrounding the vertically-slidable inner shaft in the lower outer fork member and connected with the vertically-slidable inner shaft so as to move therewith, a lower bevel-gear through which the vertically-slidable tubular outer shaft is adapted to slide, and fixed to the latter so as to turn therewith within the lower outer fork member and meshed by the vertical outer bevel-gear, an upper bevel-gear, through which the vertically-slidable inner shaft extends, fixed to the latter, so as to turn therewith, within the upper outer fork member, means for detachably connecting the vertically-slidable inner shaft and the vertically-slidable tubular outer shaft to the dasher-shaft and can respectively, and means for raising and lowering the vertically-slidable inner shaft with the vertically-slidable tubular outer shaft for disconnecting the vertically-slidable inner shaft and the vertically-slidable tubular outer shaft from the dasher-shaft and can respectively.

Signed at Chicago, Illinois, this 17th day of December, 1904.

GEORGE F. DICKSON.

Witnesses:
ROBERT BURNS,
M. H. HOLMES.